United States Patent
Moore et al.

(10) Patent No.: US 8,392,138 B2
(45) Date of Patent: Mar. 5, 2013

(54) SYSTEM AND METHOD FOR CORRECTING SAMPLING ERRORS ASSOCIATED WITH RADIATION SOURCE TUNING RATE FLUCTUATIONS IN SWEPT-WAVELENGTH INTERFEROMETRY

(75) Inventors: Eric D. Moore, Boulder, CO (US); Robert R. McLeod, Boulder, CO (US)

(73) Assignee: The Regents of the University of Colorado, Denver, CO (US)

( * ) Notice: Subject to any disclaimer, the term of this patent is extended or adjusted under 35 U.S.C. 154(b) by 868 days.

(21) Appl. No.: 12/537,003

(22) Filed: Aug. 6, 2009

(65) Prior Publication Data

US 2010/0145648 A1   Jun. 10, 2010

Related U.S. Application Data

(60) Provisional application No. 61/087,313, filed on Aug. 8, 2008.

(51) Int. Cl.
   *G01B 9/02* (2006.01)
   *G06F 19/00* (2011.01)

(52) U.S. Cl. ....... 702/89; 73/1.01; 73/865.8; 250/252.1; 356/450; 702/90; 702/107; 702/176; 702/189

(58) Field of Classification Search ............. 73/1.01, 73/1.88, 432.1, 865.9; 250/252.1; 356/450, 356/900; 702/1, 85, 88, 89, 90, 107, 127, 702/176, 187, 189
See application file for complete search history.

(56) References Cited

U.S. PATENT DOCUMENTS

| | | | | |
|---|---|---|---|---|
| 3,494,698 A | * | 2/1970 | Neumann | 356/450 |
| 3,528,744 A | * | 9/1970 | Ware | 356/450 |
| 3,972,618 A | * | 8/1976 | Hawes | 356/451 |
| 4,046,477 A | * | 9/1977 | Kaule | 356/35.5 |
| 4,679,248 A | * | 7/1987 | McKeown | 455/226.1 |
| 4,699,513 A | * | 10/1987 | Brooks et al. | 356/478 |
| 4,818,064 A | * | 4/1989 | Youngquist et al. | 385/12 |
| 4,872,755 A | * | 10/1989 | Kuchel | 356/495 |
| 5,767,972 A | * | 6/1998 | Demarest | 356/498 |
| 6,496,261 B1 | * | 12/2002 | Wilsher et al. | 356/450 |
| 6,597,459 B2 | * | 7/2003 | Demarest | 356/498 |
| 6,657,727 B1 | * | 12/2003 | Izatt et al. | 356/450 |
| 6,825,934 B2 | * | 11/2004 | Baney et al. | 356/477 |
| 6,882,428 B2 | * | 4/2005 | Baney et al. | 356/477 |
| 7,006,232 B2 | * | 2/2006 | Rollins et al. | 356/479 |
| 7,102,756 B2 | * | 9/2006 | Izatt et al. | 356/479 |
| 7,362,444 B2 | * | 4/2008 | Izatt et al. | 356/479 |
| 7,515,276 B2 | * | 4/2009 | Froggatt et al. | 356/497 |
| 7,603,045 B2 | * | 10/2009 | Hoshida et al. | 398/209 |
| 7,869,719 B2 | * | 1/2011 | Hoshida et al. | 398/209 |
| 7,948,633 B2 | * | 5/2011 | Froggatt et al. | 356/479 |
| 8,004,686 B2 | * | 8/2011 | Froggatt et al. | 356/477 |
| 2002/0021449 A1 | * | 2/2002 | Demarest | 356/498 |
| 2003/0112442 A1 | * | 6/2003 | Baney et al. | 356/477 |
| 2003/0174338 A1 | * | 9/2003 | Baney et al. | 356/477 |
| 2003/0227631 A1 | * | 12/2003 | Rollins et al. | 356/479 |

(Continued)

*Primary Examiner* — Edward Cosimano
(74) *Attorney, Agent, or Firm* — Renner, Otto, Boisselle & Sklar, LLP

(57) ABSTRACT

The frequency-sampling method is widely used to accommodate nonlinear electromagnetic source tuning in swept-wavelength interferometric techniques, such as optical frequency domain reflectometry (OFDR) and swept-wavelength optical coherence tomography (OCT). Two sources of sampling errors are associated with the frequency-sampling method. One source of error is the limit of an underlying approximation for long interferometer path mismatches and fast electromagnetic source tuning rates. A second source of error is transmission delays in data acquisition hardware. Aspects of the invention relate to a method and system for correcting sampling errors in swept-wavelength interferometry systems such that the two error sources correct sampling errors associated with the first radiation path and the second radiation path cancel to second order.

30 Claims, 3 Drawing Sheets

U.S. PATENT DOCUMENTS

| | | | |
|---|---|---|---|
| 2004/0218189 A1* | 11/2004 | Izatt et al. | 356/479 |
| 2005/0047780 A1* | 3/2005 | Hoshida et al. | 398/33 |
| 2007/0024868 A1* | 2/2007 | Izatt et al. | 356/511 |
| 2008/0024785 A1* | 1/2008 | Froggatt et al. | 356/450 |
| 2009/0103100 A1* | 4/2009 | Froggatt et al. | 356/477 |
| 2009/0214203 A1* | 8/2009 | Hoshida et al. | 398/33 |
| 2010/0321702 A1* | 12/2010 | Froggatt et al. | 356/450 |

* cited by examiner

SYSTEM AND METHOD FOR CORRECTING SAMPLING ERRORS ASSOCIATED WITH RADIATION SOURCE TUNING RATE FLUCTUATIONS IN SWEPT-WAVELENGTH INTERFEROMETRY

RELATED APPLICATION DATA

This application claims the benefit of expired U.S. Provisional Application Ser. No. 61/087,313, filed Aug. 8, 2008, the disclosure of which is herein incorporated by reference in its entirety.

TECHNICAL FIELD

The present invention relates generally to an apparatus and a method to correct sampling errors associated with wavelength tuning rate fluctuations in swept-wavelength interferometry.

BACKGROUND

A technique known as "frequency-sampling" is widely used to accommodate nonlinear wavelength tuning in swept-wavelength interferometric techniques. Swept-wavelength interferometry (SWI) is a versatile measurement technique that has found a wide range of applications, such as optical frequency domain reflectometry (OFDR), swept-wavelength optical coherence tomography (OCT) and frequency-modulated continuous-wave (FMCW) radar.

These technologies generally use the same core SWI system, namely a source of electromagnetic radiation capable of a continuous wavelength sweep and interferometer comprising a fixed reference path and a measurement path. In general, SWI systems also rely on the ability to apply a Fourier transform to the measured interference fringes. In practical systems, this Fourier transform is generally applied using the fast Fourier transform (FFT) algorithm, which imposes the requirement that data be sampled at equal intervals of the independent variable. Use of a discrete Fourier transform avoids this requirement but introduces the additional necessity that the size of each unequal interval be known. Because the independent variable of interest in swept-wavelength measurements is not time, but rather the instantaneous frequency of the electromagnetic radiation source, any nonlinearity in the tuning of the radiation wavelength renders simple time-synchronous sampling of the fringe data inadequate.

Historically, the problem of nonlinear wavelength tuning has been dealt with in three ways. One is to focus on the design and execution of a tunable radiation source with a tuning curve that is linear in time. Depending on the source, this approach can be difficult or impossible and, in general, is less convenient than the other options. Rather than linearizing the wavelength sweep, a second technique uses an auxiliary interferometer to measure the wavelength tuning rate as it changes throughout a sweep. This information is then used to resample the fringe data from a grid of equal time intervals to a grid of equal frequency intervals. The third technique, the frequency-sampling method, also uses an auxiliary interferometer, but avoids the potentially large number of interpolations required for the previous technique by using the interferometer output as a clock signal to trigger data acquisition. This method has been widely adopted because of its convenience and accuracy; however, sampling errors that result in non-uniform frequency intervals can still occur when using an interferometric clock.

SUMMARY

Many tunable electromagnetic radiation sources, for example, commercially available tunable lasers, broadband sources with a tunable filter, or microwave antennas, can exhibit significantly nonlinear tuning that can lead to sampling errors when used as an interferometric clock. Specifically, two sources of sampling error have been identified. The first source of sampling error is intrinsic in the frequency-sampling method because the frequency spacing of the output fringes is uniform only to first order. Therefore, the approximation of uniform frequency spacing breaks down as both interferometer path length mismatches and average wavelength tuning rates increase. The second source of sampling error exists in practical SWI systems employing non-ideal data acquisition (DAQ) hardware, in which finite signal propagation delays cause the sampled data to lag behind the clock signal by a small time interval. These delays coupled with a nonlinear wavelength sweep leads to a sampling grid with unequal frequency increments.

One aspect of the invention relates to configuring a SWI system such that the two error sources cancel one another to second order. This error correction results in greater applicability of the frequency-sampling method for long interferometers and fast wavelength tuning. In principle, this error correction technique can be applied to any SWI system, including all of the applications of SWI outlined above.

Another aspect of the invention relates to a swept wavelength interferometer system, including: an electromagnetic radiation source for directing incident electromagnetic radiation over a range of wavelengths to a splitter, wherein the splitter routes a portion of the incident electromagnetic radiation along a first radiation path and another portion of the incident electromagnetic radiation is routed along a second radiation path; a first interferometer coupled to the splitter along the first path, wherein a first detector measures one or more characteristics of the incident electromagnetic energy along the first radiation path; a second interferometer coupled is to the splitter along the second path, wherein a second detector measures one or more characteristics of the incident electromagnetic radiation along the second radiation path, wherein the first detector provides a trigger signal used to sample electromagnetic radiation detected by the second detector; and a delay element selectively coupled along the first radiation path or the second radiation path to correct sampling errors based at least in part on a differential delay associated with the electromagnetic radiation traversing the first radiation path and the second radiation path.

Another aspect of the invention relates to a swept wavelength interferometer system, including: an electromagnetic radiation source for directing incident electromagnetic radiation over a range of wavelengths to a splitter, wherein the splitter routes a portion of the incident electromagnetic radiation along a first radiation path and another portion of the incident electromagnetic radiation is routed along a second radiation path; a first interferometer coupled to the splitter along the first path, wherein a first detector measures one or more characteristics of the incident electromagnetic energy along the first radiation path; a second interferometer coupled to the splitter along the second path, wherein a second detector measures one or more characteristics of the incident electromagnetic radiation along the second radiation path, wherein the first detector provides a trigger signal used to sample electromagnetic radiation detected by the second detector; a data acquisition module coupled to the first detector and second detector for storing information received from the first detector and the second detector; and an electronic delay element coupled to the data acquisition module to correct sampling errors based at least in part on a differential delay associated with the electromagnetic radiation traversing the first radiation path and the second radiation path.

Another aspect of the invention relates to a method of correcting sampling errors due to electromagnetic radiation tuning fluctuation in a swept-wavelength interferometry system, the method including: calculating a first delay period between a trigger event and an acquisition event in a swept-wavelength interferometry system having an electromagnetic radiation source for directing electromagnetic radiation over a range of wavelengths, wherein the trigger event occurs on a first radiation path and the acquisition event occurs on a second radiation path; calculating a second delay period in the swept-wavelength interferometry system, wherein the second delay period includes a duration of time for the electromagnetic radiation to traverse the first radiation path and the second radiation path; inserting a delay element in the first radiation path or the second radiation path to correct for sampling errors, wherein the delay element is configured to account for the first delay period and the second delay period; and storing one or more trigger events and data acquisition events in a data acquisition module.

Another aspect of the invention relates to a method of correcting sampling errors due to electromagnetic radiation tuning fluctuation in a swept-wavelength interferometry system, the method including: calculating a first delay period between a trigger event and an acquisition event in a swept-wavelength interferometry system having an electromagnetic radiation source for directing electromagnetic radiation over a range of wavelengths, wherein the trigger event occurs on a first radiation path and the acquisition event occurs on a second radiation path; calculating a second delay period in the swept-wavelength interferometry system, wherein the second delay period includes a duration of time for the electromagnetic radiation to traverse the first radiation path and the second radiation path; storing the one or more trigger events and data acquisition events in a data acquisition module; inserting an electronic delay element in the data acquisition module, such that the trigger events and the data acquisition events are stored in a manner to account for correction for sampling errors associated with the first delay period and the second delay period.

Another aspect of the invention relates to a method of correcting sampling errors due to electromagnetic radiation tuning fluctuation in swept-wavelength interferometry, the method including: outputting electromagnetic radiation over a range of wavelengths by an electromagnetic source; splitting the electromagnetic radiation into a first radiation path for generating a trigger signal and a second radiation path for sampling data; and calculating a differential delay period to correct sampling errors associated with the first radiation path and the second radiation path; inserting a delay element in at least one of is the first radiation path or the second radiation path to account for the differential delay period; and storing the trigger signal and the sampling data in a manner to account of the differential delay period.

A number of features are described herein with respect to embodiments of the invention; it will be appreciated that features described with respect to a given embodiment also may be employed in connection with other embodiments.

The invention comprises the features described herein, including the description, the annexed drawings, and, if appended, the claims, which set forth in detail certain illustrative embodiments. These embodiments are indicative, however, of but a few of the various ways in which the principles of the invention may be employed. Although the invention is shown and described with respect to illustrative embodiments, it is evident that equivalents and modifications will occur to those persons skilled in the art upon the reading and understanding hereof. The present invention includes all such equivalents and modifications and is limited only by the scope of the claims if appended hereto.

DESCRIPTION

Aspects of the invention are directed to correcting sampling errors associated with wavelength tuning rate fluctuations in swept-wavelength interferometry systems, such as an optical frequency domain reflectometry (OFDR),swept-wavelength optical coherence tomography (OCT), and frequency-modulated continuous-wave (FMCW) radar. This error correction results in greater applicability of the frequency-sampling method for long interferometers and fast laser tuning. Such error correction technique can be applied to any SWI system.

Figure 1:
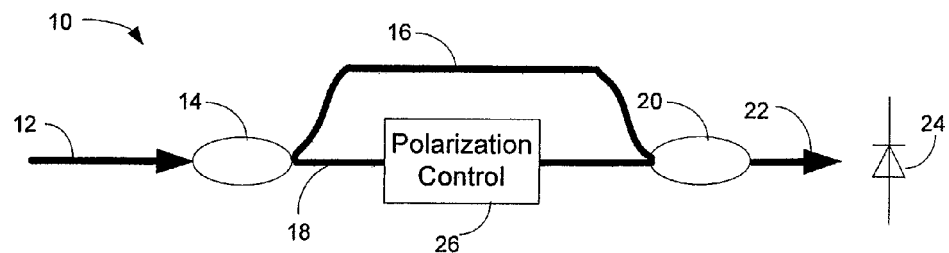
FIG. 1 is a schematic illustration of an interferometer suitable for producing an analog clock signal for triggering swept-wavelength data acquisition.

FIG. 1 is a schematic block diagram of an exemplary system 10 suitable for producing an analog clock signal for triggering swept-wavelength data acquisition implemented in single-mode optical fiber. While aspects of the invention will be illustrated in terms of an optical system, one of ordinary skill in the art will readily appreciate that the present invention may be directed to other electromagnetic radiation spectra, including for example, microwave, radio frequency, ultraviolet, infrared, x-rays, gamma rays, etc.

FIG. 1 illustrates a Mach-Zehnder interferometer configuration. One of ordinary skill in the art will appreciate that other interferometer configurations including, for example, a Michelson, a Fabry-Perot interferometer, etc. may also be used in accordance with aspects of the invention.

The system 10 includes an electromagnetic radiation input 12 (e.g., an input light) that is split by a splitter 14. Other suitable electromagnetic radiation input sources include a laser, a broadband source coupled with a tunable filter, a microwave antenna, etc. The splitter 14 may be any type of device that may be used to split or route electromagnetic radiation received into two or more radiation paths. For example, the splitter may be a coupler for combining optical mediums (e.g., a fiber optic cable, etc.), a beam splitter and the like.

As shown in FIG. 1, the splitter 14 may be a 3 dB coupler that splits the incoming light into two separate radiation paths (e.g., radiation paths 16 and 18). The two radiation paths 16 and 18 are recombined after traveling different distances at another splitter 20. The splitter 20 functions to combine the electromagnetic radiation that has traversed radiation paths 16, 18. Splitter 20 may be any type of device that can be used to combine electromagnetic radiation received from two or more radiation paths. In general, the splitter 20 combines the received light into a single output signal 22. In this case, the output signal is a fringe pattern that may be detected by a detector 24 (e.g., a photodetector, a phase detector, frequency is detector) or other suitable detector).

One of ordinary skill in art will readily appreciate that the output signal and the detector may vary based on the electromagnetic radiation used in the system.

As shown in FIG. 1, the second radiation path 18 includes polarization control 26. Generally, the polarization control 26 may be required in one arm of the interferometer to avoid polarization fading of the interference fringes associated with an optical system. To account for arbitrary nonlinear tuning of the radiation source, the electric field at the interferometer input may be defined as $$E(t)=E_0 e^{i\phi(t)}, \quad (1)$$

where $\phi(t)$ is a time-varying phase and $E_0$ is a constant amplitude. In this case the instantaneous frequency of the radiation input source is given by $$v(t) = \frac{1}{2\pi}\frac{d\phi}{dt}. \quad (2)$$

As set forth above, the electromagnetic radiation input 12 (e.g., an input light) is split by a splitter 14, and the two paths are recombined after traveling different distances. For convenience, the splitting ratio is assumed to be equal to unity, though other splitting ratios may be used. Also for convenience, zero delay is defined as the group delay through the shorter of the two paths. The group delay mismatch between the two paths is $\tau$. With these definitions in place, the optical fringe pattern output by the interferometer produces a voltage at the detector 24 (e.g., photodetector) given by $$U(t) = \sigma|E(t) + E(t+\tau)|^2 \quad (3)$$
$$= U_0\{1 + \cos[\phi(t+\tau) - \phi(t)]\},$$

where $\sigma$ is a constant of proportionality that depends on the detector sensitivity, and $U_0 = 2\sigma|E_0|^2$. The function $\phi(t+\tau)$ may be Taylor expanded about t:

$$\phi(t+\tau) = \sum_{n=0}^{\infty} \frac{\tau^n}{n!}\phi^{(n)}(t). \quad (4)$$

Writing the zero- and first-order terms of the sum explicitly and using Eq. (2) yields an expression for the phase of the output fringe pattern:

$$\phi(t+\tau) - \phi(t) = 2\pi v(t)\tau + 2\pi\sum_{n=2}^{\infty}\frac{\tau^n}{n!}v^{(n-1)}(t). \quad (5)$$

If second- and higher-order terms of the sum in Eq. (5) are neglected, then substitution back into Eq. (3) yields a fringe pattern that is periodic in frequency [6]. This approximation is valid when $$\tau^2 \frac{dv}{dt} \ll 1, \quad (6)$$

i.e., for short interferometer path length differences and/or slow wavelength tuning rates. In this case the frequency spacing between triggers takes on the uniform value of $\Delta v = \tau^{-1}$.

The preceding approximation is valid for many practical systems and has led to widespread use of the frequency-sampling method. Many electromagnetic radiation sources (e.g., modern tunable lasers, broadband sources coupled with a tunable filter, microwave antennas, etc.), however, routinely have sufficiently long coherence lengths and high tuning rates such that higher-order terms in Eq. (5) are no longer negligible. When these higher-order terms are retained, the fringe pattern output by the interferometer is no longer periodic in frequency. These deviations from periodicity result in non-uniform frequency intervals between trigger events; instead of the uniform interval $\Delta v = \tau^{-1}$, the $i^{th}$ interval will depart from $\tau^{-1}$ by some amount $\delta v_i^1$, i.e., $\Delta v_i = \tau^{-1} + \delta v_i^1$. The superscript I is used to denote that the sampling error derived here is the intrinsic error present in the frequency-sampling method, distinct from sampling errors due to delays in the data acquisition (DAQ) hardware, which are treated below.

To derive an expression for the sampling error $\delta v_i^1$, the set of times $t_i$ at which triggers occur are considered. These times are each separated by one period of the fringe pattern described by Eq. (3). The phase of the fringe pattern, represented in Eq. (5), will experience a change of $2\pi$ between $t_i$ and $t_{i+1}$. To is express the evolution of a single period mathematically, the right side of Eq. (5) at time $t_i$ is subtracted from the same expression at time $t_{i+1}$, yielding $$2\pi\tau[v(t_{i+1}) - v(t_i)] + 2\pi\sum_{n=2}^{\infty} + 2\pi\sum_{n=2}^{\infty}\frac{\tau^{n-1}}{n!}[v^{(n-1)}(t_{i+1}) - v^{(n-1)}(t_i)] = 2\pi \quad (7)$$

Rearranging terms, the change in frequency from one trigger event to the next can be expressed as $$\Delta v_i \equiv v(t_i+1) - v(t_i) = \tau^{-1} + \delta v_i^I, \quad (8)$$

where $$\delta v_i^I = -\sum_{n=2}^{\infty}\frac{\tau^{n-1}}{n!}[v^{n-1}(t_i+1) - v^{(n-1)}(t_i)] \quad (9)$$

Here $\delta v_i^1$ represents a sampling error intrinsic to interferometric triggering that depends on the interferometer path mismatch and the derivatives of the tuning rate. This error couples to the final measurement through the Fourier transform, leading to both amplitude and phase errors. These errors impose a limit on the interferometer path length differences allowable in an SWI system for a given radiation source that exhibits nonlinear wavelength tuning. This limit can be extended, however, by using sampling errors due to delays in the DAQ hardware to cancel the intrinsic sampling errors to second order.

Even when the approximation of Eq. 6 is valid, uniform frequency intervals between interferometrically triggered data points are still not ensured because of a second source of sampling errors: propagation delays in the DAQ hardware.

Like the intrinsic sampling errors, sampling errors due to DAQ delay occur when the wavelength sweep of the radiation source is not linear in time.

To derive an expression for the sampling errors due to the DAQ delay, it is assumed that a detected trigger signal U varies as a simple cosine in frequency (as is the case when higher-order sampling errors can be neglected):

$$\tilde{U}(t) = \tilde{U}_0\{1 + \cos[2\pi v(t)\tau]\}. \quad (10)$$

Because this signal is periodic in frequency, it produces a set of trigger times $t_i$ that correspond to equal frequency steps:

$$v(t_{i+1}) - v(t_i) = \tau^{-1}. \quad (11)$$

A fixed delay $\delta t$ may be introduced that includes two components: the differential radiation propagation delay between the trigger signal and the sampled signal, and the electronic delay between a trigger event and the moment a voltage value is recorded by the data acquisition hardware. Such a finite delay will necessarily exist because of radiation and electronic transmission delays if the analog clock and data channels are not carefully path-matched. Because of this delay, the data is not sampled at the times $t_i$, but rather at the set of times $t_i + \delta t$. The effect of this delay is to perturb each frequency interval of the sampled data by an amount $\delta v_i^D$;

$$v(t_{i+1} + \delta t) - v(t_i + \delta t) = \tau^{-1} + \delta v_i^D. \quad (12)$$

If the wavelength tuning rate of the source is constant, the change in frequency over each $\delta t$ will be the same and $\delta v_i^D = 0$ for all i. But if the tuning rate is changing, the frequency change over each &will be different, and the frequency spacing between sampling points will no longer be uniform. To account for changes in tuning rate, $v(t+\delta t)$ is expanded as $$v(t + \delta t) = \sum_{n=0}^{\infty} \frac{\delta t^n}{n!} v^{(n)}(t). \quad (13)$$

Substituting Eq. (13) into Eq. (12) and explicitly writing the first term of the sums yields $$v(t_{i+1}) - v(t_i) + \sum_{n=1}^{\infty} \frac{\delta t^n}{n!} v^n(t_{i+1}) - \sum_{n=1}^{\infty} \frac{\delta t^n}{n!} v^n(t_i) = \tau^{-1} + \delta v_i^D. \quad (14)$$

Subtracting Eq. (11) from Eq. (14) results in an expression for the sampling error due to the data acquisition delay:

$$\delta v_i^D = \sum_{n=0}^{\infty} \frac{\delta t^n}{n!} [v^{(n)}(t_{i+1}) - v^{(n)}(t_i)]. \quad (15)$$

Generally speaking, the data acquisition delay $\delta t$ can be controlled by adding a delay line to either the trigger channel or the measurement channel. Therefore it is possible to force $\delta v_i^D = 0$ by appropriately path-matching the system such that $\delta t = 0$. This strategy does not always yield the best system performance, however. Instead, a nonzero sampling error due to the DAQ delay can be used to cancel the is intrinsic sampling errors derived above through a prudent choice of $\delta t$.

Expressions for sampling errors due to two sources are described above: (1) errors intrinsic to interferometric triggering due to wavelength tuning rate fluctuations (Eq. 9) and (2) errors that are due to delays in data acquisition hardware in the presence of laser tuning rate fluctuations (Eq. 15). When both of these errors are present, data is acquired at the times $t_i + \delta t$, and the frequency spacing between acquisitions is $$\Delta v_i = \tau^{-1} + \delta v_i^I + \delta v_i^D \quad (16)$$

$$= \tau^{-1} - \sum_{n=1}^{\infty} \frac{\tau^n}{(n+1)!} [v^{(n)}(t_{i+1}) - v^{(n)}(t_i)] +$$

$$\sum_{n=1}^{\infty} \frac{\delta t^n}{n!} [v^{(n)}(t_{i+1}) - v^{(n)}(t_i)],$$

where the summation index for $\delta v_i^I$ has been converted from n to n−1 in order to start the summation at n=1. It is often the case that the sampling errors are dominated by the first-order terms of the two sums. In this case, the higher-order terms can be neglected, and the frequency spacing becomes $$\Delta v_i = \tau^{-1} + [\delta t - \tau/2][v'(t_{i+1}) - v'(t_i)]. \quad (17)$$

As mentioned above, $\delta t$ may be controlled using delay lines in the system. Therefore, if $\delta t = \tau/2$, the error term will be driven to zero and result in a cancelation of the sampling errors. This yields error-free sampling to second order in $\phi(t)$ and is valid as long as $\tau^3(d^2v/dt^2) \ll 1$.

The cancelation of the first-order error term has been shown above. It is also possible to cancel any individual term in the sum representing the total sampling error. Cancelation of an arbitrary order is possible because each successive term in the sums that constitute $\delta v_i^I$, and $\delta v_i^D$ differs by a factor of 1/n. Therefore cancelation of any single term in the error expansion is possible through the proper choice of $\delta t$, but the required $\delta t$ is generally different for each term. In general, to drive the $n^{th}$ order term of the sampling error to zero, the DAQ delay must be $\delta t = \tau(n+1)^{-1/n}$.

Figure 2:
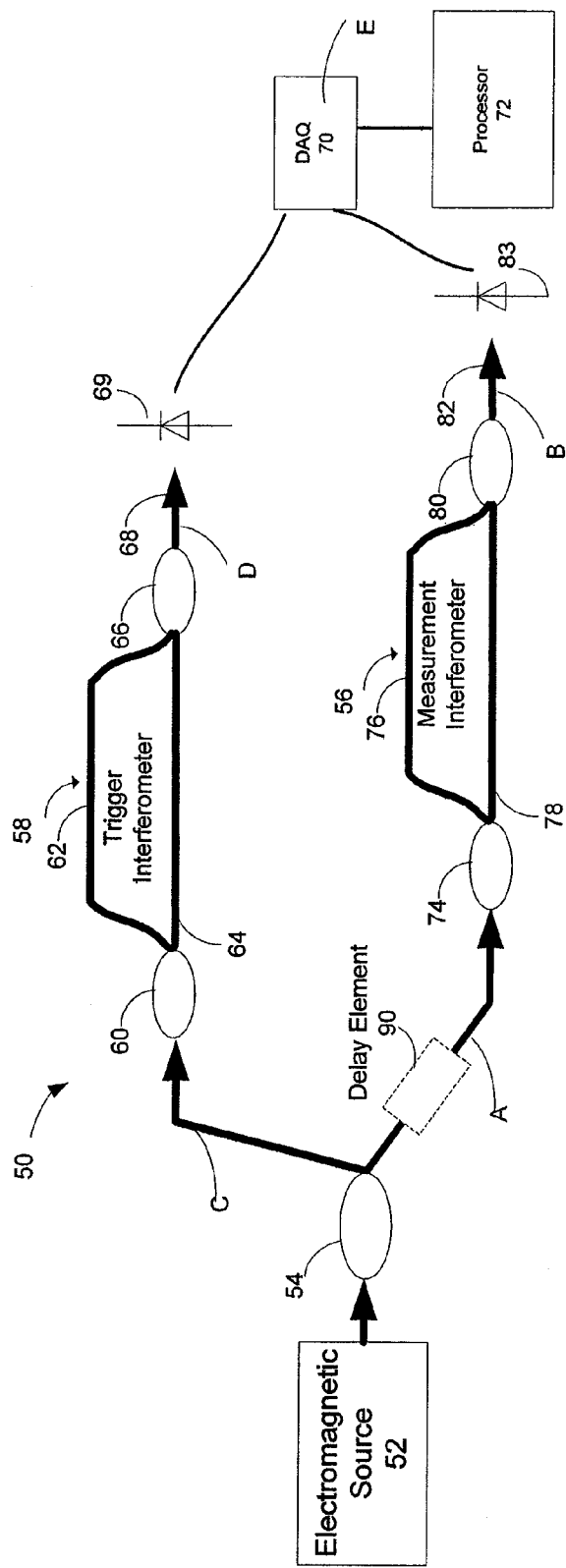
FIG. 2 is a schematic illustration of a swept-wavelength interferometry system in accordance with aspects of the present invention.

The preceding analysis illustrates that sampling errors occur when the wavelength tuning rate of the radiation source is not constant. One of ordinary skill in the art will readily appreciate that the discussion set forth above is also applicable to other SWI systems including, for example, systems utilizing electromagnetic radiation spectra, including for example, microwave, radio frequency, ultraviolet, visible, infrared, x-rays, gamma rays, etc. Referring to FIG. 2, an exemplary SWI system 50 is illustrated.

The system 50 utilizes single-mode optical fiber and components designed for use in the C telecommunications band. Again, while the exemplary SWI system 50 is illustrated utilizing optical components, one of ordinary in the art will readily appreciate that the components used in the system may vary based on the electromagnetic radiation spectra implemented by the system. For example, while system 50 utilizes single-mode optical fibers, the transmission paths need not be fiber and include, for example, free space, a waveguide, an integrated optical waveguide, coaxial cable, microwave waveguide or any suitable structure for guiding the desired electromagnetic radiation along one or more predetermined radiation paths.

Not shown in FIG. 2 are polarization control and a tap that directs 2% of the laser output to an hydrogen cyanide (HCN) wavelength reference.

Referring to FIG. 2, the SWI system 50 includes an electromagnetic radiation source 52. In an exemplary system this source is an Agilent 81680A tunable laser, though other sources may be used, (e.g., a broadband source coupled with a tunable filter, an electronic oscillator, a microwave antenna, etc.). The is electromagnetic radiation source 52 may be any electromagnetic energy source that provides electromagnetic energy over a range of wavelengths. The range may be a continuous range, e.g., as in an analog signal that changes continuously from one level to another without discrete steps in between the levels. Alternatively or additionally, the range may include a number of distinct wavelengths that are between respective wavelength values at respective opposite ends of the range. The wavelength range may be the visible range of wavelengths or part of the visible range, may be in the ultraviolet, infrared, or some other range, or may be a combination or part or all of the mentioned and/or other ranges. The range may be continuous or may include discontinuous portions. An exemplary wavelength range is from about 1530 nm to about 1538 nm. The invention may be used with other wavelengths and wavelength ranges.

The bulk of the electromagnetic radiation output from the electromagnetic source 52 is split by a splitter 54, which transmits substantially about one-half of the light to the measurement interferometer 56 (lower radiation path) and the other one-half to the trigger interferometer 58 (upper radiation path). The splitter 54 may be any type of device that may be used to split or route electromagnetic radiation received into two or more radiation paths. For example, the splitter 54 may be a coupler for combining optical mediums (e.g., a fiber optic cable, etc.), a beam splitter, etc.

One of ordinary skill in the art will appreciate that the specific form of the splitter will depend on the portion of the electromagnetic spectrum utilized in a particular embodiment of the invention.

The electromagnetic radiation that enters trigger interferometer path 58 is split by another splitter 60, which sends one-half of the electromagnetic radiation that entered the trigger interferometer path 58 along a first trigger path 62 and the other one-half along a second trigger path 64.

Splitter 66 re-combines the electromagnetic radiation and outputs signal 68 for detection by a detector 69 (e.g., a photodiode, other light sensitive detector, an antenna, a frequency sensitive detector, phase detector, and the like) and input into the data acquisition module 70, which is coupled to a personal computer (or other processor) 72 for analyzing and/or processing the received signals. The trigger interferometer 58 uses a Mach-Zehnder geometry with a group delay difference of $\tau_1$=516 ns between the two paths. Of course, the Mach-Zehnder configuration and the group delay difference is exemplary and other types of interferometers (e.g., a Michelson interferometer, a Fabry-Perot interferometer, etc.) may be used in accordance with aspects of the present invention. In addition, other group delay differences also may be used in accordance with aspects of the present invention.

The group delay of $\tau_i$=516 ns between the two paths was chosen to be much less than the coherence length of the electromagnetic source to avoid fringe fading due to coherence effects, but large enough such that approximation (Eq. 6) is not valid. The electromagnetic source 52 illustrated in FIG. 2 may be a tunable laser, which has a laser wavelength that is swept at a nominal rate of 40 nm/s. Therefore, for this exemplary combination of tuning rate and relative interferometer delay, $\tau_i^2$(dv/dt)≈1.3.

The measurement interferometer 56 also may use a Mach-Zehnder geometry. Other interferometers may also be used for the measurement interferometer. The electromagnetic radiation (e.g., light) entering measurement interferometer path is split by another splitter 74, which transmits a portion of the electromagnetic radiation that entered the measurement interferometer path along a first measurement interferometer path 76 and another portion of the electromagnetic radiation along a second trigger interferometer path 78. A splitter 80 re-combines the signal 82 for output for detection by a detector 83 (e.g., a photodiode, other light sensitive detector, an antenna, a frequency sensitive detector, and the like) and input to the data acquisition hardware 70. The data acquisition hardware 70 samples output signal 82 at desired times using the output signal 68 of the trigger interferometer as the clock source.

The group delay difference between the two paths of the measurement interferometer is $\tau_m$=13.2 ns. For this, interferometer inequality (Eq. 6) holds, since $\tau_i^2$(dv/dt)≈$10^{-3}$. Therefore, the sampled output signal (e.g., fringe pattern) is well described by Eq. (10) in the absence of sampling errors. Sampling errors will generally cause the phase of the sampled fringe pattern to deviate from linearity as a function of optical frequency. The exemplary SWI system 50 was constructed without attention to the overall delays of the system, other than the differential delays between interferometer arms, in order to demonstrate the phenomenon of sampling errors. A delay element was later added to cancel sampling errors in accordance with the present invention. One of ordinary skill in the art will readily appreciate that the group delay difference can be an amount up to half of the trigger interferometer delay. For longer delays inequality (Eq. 6) will no longer hold, but aspects of the invention may still be used.

Figure 3:
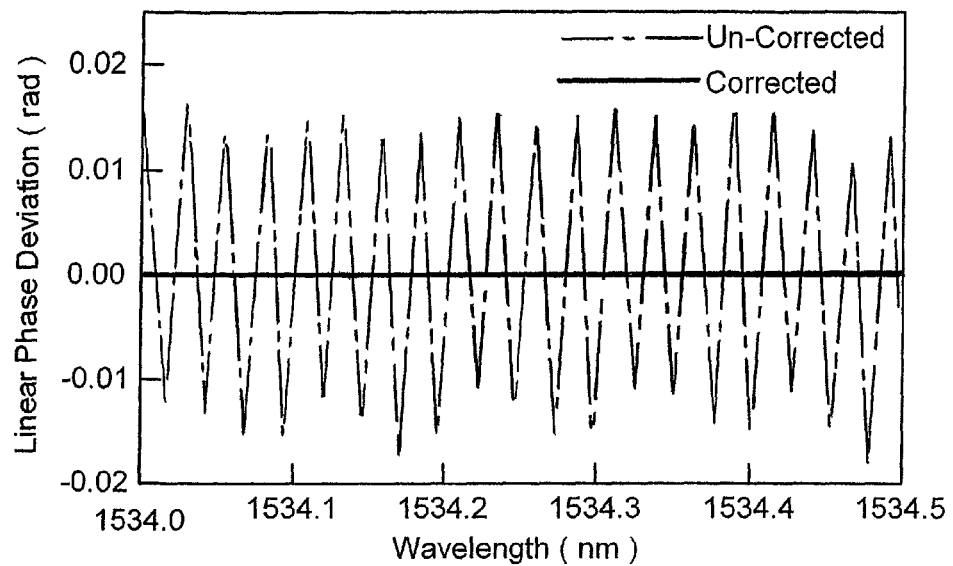
FIG. 3 is a graph of measured group delay data for a cleaved section of single mode fiber having unbalanced delays.

The fringe pattern output by the measurement interferometer was sampled by the data acquisition hardware 70 (e.g., a National Instruments PCI-6115 DAQ card) using the output signal 68 (e.g., fringe pattern output) of the trigger interferometer as an analog clock. The electromagnetic radiation source (e.g., a tunable laser) was swept from 1530 to 1538 nm at a nominal rate of 40 nm/s. In order to produce a plot of the phase of the sampled interferogram as a function of optical frequency, the following data processing steps were applied: 1), the fringe data was transformed to the time domain using an FFT algorithm; 2) a digital bandpass filter selects a 4 ns segment of the data centered on the positive delay sideband in the time domain; 3) the selected subset of the time domain data is rotated such that the peak of the sideband occupies the DC location of the 4 ns data array; 4) the rotated data segment is converted back to the frequency domain using an inverse FFT, resulting in complex frequency domain data; 5) the phase of this data is unwrapped and a linear curve fit is subtracted. The resulting measurement of the deviation from linear phase appears as an exemplary dot-dash curve in FIG. 3. The large deviation is equally present in single scan and averaged data, showing the sampling errors to be systematic in nature. The data plotted in FIG. 3 is the average of sixteen (16) measurements. Referring to FIG. 3, the un-corrected data signal is labeled as "un-corrected" and varies in linear phase deviation from about 0.015 to −0.02 for the wavelength range of 1534.0 to 1534.5 nm. The corrected data signal is labeled as "corrected" and has only slight variation about 0.00 for the wavelength range of 1534.0 to 1534.5 nm.

The delays associated with each electromagnetic radiation path in the system, as well as an electronic delay between a trigger event on the analog clock detector and the acquisition of the corresponding datum were then measured. Electromagnetic radiation delays were measured by incorporating the path length to be measured into a Mach-Zehnder interferometer using two splitters. The relative delay of the interferometer was measured with and without the additional path length to be measured by counting fringes as the electromagnetic radiation source is swept between two known wavelengths.

An HCN wavelength reference was used to provide known wavelength features. This measurement technique provides accuracy of better than 1 ns even when inequality (Eq. 6) does not hold because the laser tuning rate variations are oscillatory. Tuning rate variations that oscillate about the mean rate cause the sampling errors, described by Eq. (16), to cancel out over a large number of samples. Expressed another way, while the sample spacing is not equal due to sampling errors, the average sample spacing will be $\tau^{-1}$ because the sampling errors average to zero for the given laser tuning characteristics.

The electronic delay associated with the DAQ hardware 70 was measured by splitting a sinusoidally modulated laser signal and sending equal parts to the trigger detector and the measurement detector. By sampling the same signal that is used for triggering, the difference between the sampled voltage and the trigger threshold voltage determines the delay between a trigger event and an acquisition event according to $$\delta t_e = \frac{\sin^{-1} V/A}{2\pi f}, \quad (18)$$

where V is the sampled voltage level, A is the amplitude of the modulated signal, and f is the modulation frequency. The modulation frequency was chosen to correspond to the average sampling frequency that results from using the trigger interferometer with a 516 ns relative delay and an electromagnetic source tuning rate of 40 nm/s.

Measurement of all system delays determined that before correction the overall $\delta t$ for the system was 567 ns. Since the value of $\tau_t/2=258$ is necessary to correct sampling errors, and addition of delay to the measurement path contributes negative delay to $\delta t$, 309 ns must be added to the measurement path in this exemplary system 50.

Next, the SWI system 50 was modified to incorporate a delay element 90, as shown in FIG. 2. The delay element 90 may be any type of element (e.g., a fiber optic cable, the length of which directly affects the amount of delay, mirror configurations in free space, mirror configurations in a dense medium, coaxial cable, free space, etc.) may be used to alter or delay the time the electromagnetic radiation travels the prescribed distance. One of ordinary skill in the art will appreciate that the form of the delay element will depend on the portion of the electromagnetic spectrum used in a particular embodiment of the invention.

While the delay element 90 illustrated in FIG. 2 is positioned at position "A", which prior to entering the measurement interferometer 56, it will be appreciated that the delay element 90 may be positioned in any desired location in the system 50, to correct sampling errors. For example, the delay element 90 may be positioned after the measurement interferometer 56 (e.g., at position "B"). Likewise, the delay element 90 may be positioned prior to entering the trigger interferometer 58 (e.g., at position "C") or after the trigger interferometer 58 (e.g., at position "D").

Figure 4:
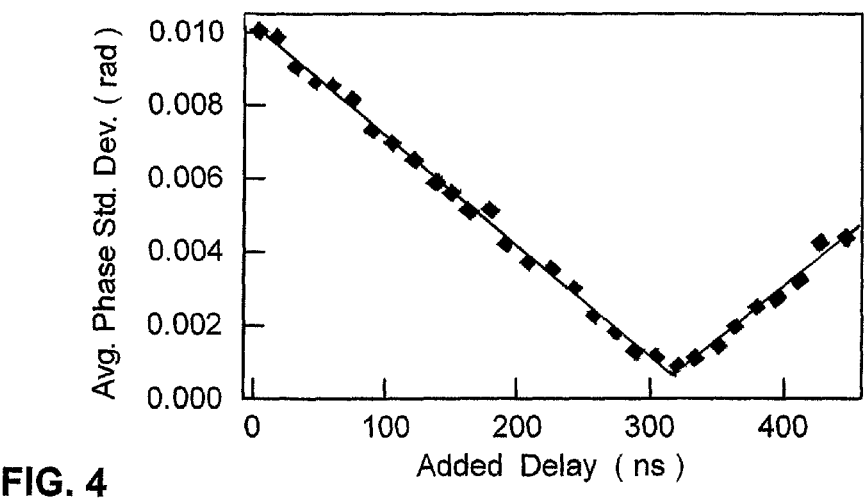
FIG. 4 is a graph of standard deviation of the deviation from linear phase of the measured fringe pattern as a function of added delay.

In addition, the delay element 90 may be applied in hardware and/or software coupled to the data acquisition hardware 70 (e.g., at position "E") and/or processor (not shown). Such delay element functions to offset the data acquired by a desired amount. An associated user may interface with hardware and/or software to implement the desired delay. The processor 72 may operate in conjunction with the data acquisition hardware 70 to allow further processing of the data and/or storing of the received data. The processor generally executes code stored in a memory (not shown) within a control circuit and/or in a separate memory in order to carry out operations associated with the data acquisition hardware 70. In addition, the processor 72 may execute code to carry out various functions associated with a general purpose computer. One of ordinary skill in the art will readily appreciate that the data acquisition hardware 70 may be a stand-alone data acquisition unit or be configured on a PC board and incorporated in the processor 72 and/or a computer associated with the processor 72. In addition, one of ordinary skill in the art can write software code that is sufficient to carry out the functionality associated with the processor and data acquisition hardware, as described herein Repeated measurements of the output signal 82 (e.g., a fringe pattern) were taken at the output of the measurement interferometer for various delay lines ranging in length from zero to 480 ns. For each measurement, the standard deviation of the deviation from linear phase was recorded. The results are plotted in FIG. 4. As shown in FIG. 4, the minimum error occurs at an added delay of 315 ns, which is in good agreement with the calculated value of 309 ns.

Accordingly, analytic expressions have been derived for two sources of sampling errors that can occur when using the frequency-sampling method to trigger data acquisition in swept-wavelength measurements when the electromagnetic source tuning rate is not constant. One source is intrinsic in the physics of a swept-wavelength interferometer when the path length difference and average electromagnetic source tuning rate are large enough such that the approximation $\tau^2$ (dv/dt)<<1 is no longer valid. The second source can be present even for small path length differences and tuning rates and is due to transmission delays in data acquisition hardware. It has further been shown that by introducing a delay element into the swept-wavelength measurement system, these errors can effectively cancel one another to second order. This eases the restrictions on the interferometer delay and electromagnetic source tuning curve necessary for using the frequency-sampling method from $\tau^2$ (dv/dt)<<1 to $\tau^3 (d^2 v/dt^2)$<<1. In the case where intrinsic sampling errors are negligible, errors due to data acquisition delays can be removed by using the delay element that matches the measurement channel path length to the trigger channel path length. As explained above, correction of sampling errors were experimentally verified, showing an order of magnitude improvement in the phase error of the sampled interferogram.

Specific embodiments of an invention are disclosed herein. One of ordinary skill in the art will readily recognize that the invention may have other applications in other environments. In fact, many embodiments and implementations are possible. The is following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

What is claimed is:

1. A swept wavelength interferometer system, comprising:
an electromagnetic radiation source for directing incident electromagnetic radiation over a range of wavelengths to a splitter, wherein the splitter routes a portion of the incident electromagnetic radiation along a first radiation path and another portion of the incident electromagnetic radiation is routed along a second radiation path;
a first interferometer coupled to the splitter along the first path, wherein a first detector measures one or more characteristics of the incident electromagnetic energy along the first radiation path;

a second interferometer coupled to the splitter along the second path, wherein a second detector measures one or more characteristics of the incident electromagnetic radiation along the second radiation path, wherein the first detector provides a trigger signal used to sample electromagnetic radiation detected by the second detector; and a delay element selectively coupled along the first radiation path or the second radiation path to correct sampling errors based at least in part on a differential delay associated with the electromagnetic radiation traversing the first radiation path and the second radiation path.

2. The system of claim 1, wherein the electromagnetic radiation source is at least one selected from a group consisting of a tunable laser, a broadband source coupled with a tunable filter or a microwave antenna.

3. The system of claim 1, wherein the first interferometer and the second interferometer is at least one selected from a group consisting of a Mach-Zehnder interferometer, a Michelson interferometer, or a Fabry-Perot interferometer.

4. The system of claim 1, wherein the splitter is at least one selected from a group consisting of a coupler or a beam splitter.

5. The system of claim 1, wherein the first detector and the second detector are at least one selected from the group of a photodetector, a frequency detector or a phase detector.

6. The system of claim 1, wherein the delay element includes at least one selected from a group of a length of fiber optic cable, an arrangement of mirrors in free space, an arrangement of mirrors in a medium other than air, a length of coaxial cable or a waveguide.

7. The system of claim 1, wherein the differential delay includes a difference in duration time for the electromagnetic radiation to traverse the first radiation path and the second radiation path.

8. The system of claim 1, wherein the differential delay includes an electronic delay associated with providing the trigger signal from the first detector and sampling electromagnetic radiation at the second detector.

9. The system of claim 1 further including a data acquisition module coupled to the first and second detectors for storing information received from the first detector and the second detector.

10. The system of claim 9 further including a processor coupled to the data acquisition module to process the information received by the data acquisition module.

11. The system of claim 10, wherein the first radiation path generates an analog clock signal for triggering swept-wavelength data acquisition along the second radiation path.

12. The system of claim 11, wherein the data acquisition module acquires information associated with the second radiation path based on the analog clock signal generated by the first radiation path.

13. A swept wavelength interferometer system, comprising:

an electromagnetic radiation source for directing incident electromagnetic radiation over a range of wavelengths to a splitter, wherein the splitter routes a portion of the incident electromagnetic radiation along a first radiation path and another portion of the incident electromagnetic radiation is routed along a second radiation path;

a first interferometer coupled to the splitter along the first path, wherein a first detector measures one or more characteristics of the incident electromagnetic energy along the first radiation path;

a second interferometer coupled to the splitter along the second path, wherein a second detector measures one or more characteristics of the incident electromagnetic radiation along the second radiation path, wherein the first detector provides a trigger signal used to sample electromagnetic radiation detected by the second detector;

a data acquisition module coupled to the first detector and second detector for storing information received from the first detector and the second detector; and an electronic delay element coupled to the data acquisition module to correct sampling errors based at least in part on a differential delay associated with the electromagnetic radiation traversing the first radiation path and the second radiation path.

14. The system of claim 13, wherein the electromagnetic radiation source is at least one selected from a group consisting of a tunable laser, a broadband source coupled with a tunable filter or a microwave antenna.

15. The system of claim 13, wherein the first interferometer and the second interferometer is at least one selected from a group consisting of a Mach-Zehnder interferometer, a Michelson interferometer, or a Fabry-Perot interferometer.

16. The system of claim 13, wherein the splitter is at least one selected from a group consisting of a coupler or a beam splitter.

17. The system of claim 13, wherein the first detector and the second detector are at least one selected from the group of a photodetector, a frequency detector or a phase detector.

18. The system of claim 13, wherein the electronic delay element is a timer that is configurable to insert a delay between data acquired by the first detector and the to second detector.

19. The system of claim 18, wherein the delay is selected to account for a differential delay between electromagnetic radiation traversing the first radiation path and the second radiation path.

20. The system of claim 19, wherein the differential delay includes an electronic delay associated with providing the trigger signal from the first detector and sampling electromagnetic radiation at the second detector.

21. The system of claim 20 further including a processor coupled to the data acquisition module to process the information received by the data acquisition module.

22. A method of correcting sampling errors due to electromagnetic radiation tuning fluctuation in a swept-wavelength interferometry system, the method comprising:

calculating a first delay period between a trigger event and an acquisition event in a swept-wavelength interferometry system having an electromagnetic radiation source for directing electromagnetic radiation over a range of wavelengths, wherein the trigger event occurs on a first radiation path and the acquisition event occurs on a second radiation path;

calculating a second delay period in the swept-wavelength interferometry system, wherein the second delay period includes a difference in duration time for the electromagnetic radiation to traverse the first radiation path and the second radiation path; and inserting a delay element in the first radiation path or the second radiation path to correct for sampling errors, wherein the delay element is configured to account for the first delay period and the second delay period.

23. The method of claim 22 including storing one or more trigger events and data acquisition events in a data acquisition module.

24. A method of correcting sampling errors due to electromagnetic radiation tuning fluctuation in a swept-wavelength interferometry system, the method comprising:
- calculating a first delay period between a trigger event and an acquisition event in a swept-wavelength interferometry system having an electromagnetic radiation source for directing electromagnetic radiation over a range of wavelengths, wherein the trigger event occurs on a first radiation path and the acquisition event occurs on a second radiation path;
- calculating a second delay period in the swept-wavelength interferometry system, wherein the second delay period includes a duration of time for the electromagnetic radiation to traverse the first radiation path and the second radiation path;
- storing the one or more trigger events and data acquisition events in a data acquisition module;
- inserting an electronic delay element in the data acquisition module, such that the trigger events and the data acquisition events are stored in a manner to account for correction for sampling errors associated with the first delay period and the second delay period.

25. A method of correcting sampling errors due to electromagnetic radiation fluctuation in swept-wavelength interferometry, the method comprising:
- outputting electromagnetic radiation over a range of wavelengths by an electromagnetic source;
- splitting the electromagnetic radiation into a first radiation path for generating a trigger signal and a second radiation path for sampling data; and
- calculating a differential delay period to correct sampling errors associated with the first radiation path and the second radiation path;
- inserting a delay element in at least one of the first radiation path or the second radiation path to account for the differential delay period; and
- storing the trigger signal and the sampling data in a manner to account of the differential delay period.

26. The method of claim 25, wherein the differential delay period includes a duration of time for the electromagnetic radiation to traverse the first radiation path and the second radiation path.

27. The method of claim 26, wherein the differential delay period includes an electronic delay associated with providing the trigger signal from the first detector and sampling electromagnetic radiation at the second detector.

28. The method of claim 25 further including acquiring the trigger signal and sampling data by a data acquisition module coupled to the first radiation path and second radiation path.

29. The method of claim 28 further including processing the acquired trigger signal and the sampling data to correct sampling errors associated with the first radiation path and the second radiation path.

30. The method of claim 29, wherein the data acquisition module acquires information associated with the second radiation path based on the trigger signal.

* * * * *